US008985313B2

(12) United States Patent
Moriyama

(10) Patent No.: US 8,985,313 B2
(45) Date of Patent: Mar. 24, 2015

(54) SCREW CONVEYOR

(71) Applicant: Kenki Co., Ltd., Fukuoka (JP)

(72) Inventor: Hideyuki Moriyama, Fukuoka (JP)

(73) Assignee: Kenki Co., Ltd., Fukuoka (JP)

( * ) Notice: Subject to any disclaimer, the term of this patent is extended or adjusted under 35 U.S.C. 154(b) by 0 days.

(21) Appl. No.: 14/100,310

(22) Filed: Dec. 9, 2013

(65) Prior Publication Data

US 2014/0190792 A1    Jul. 10, 2014

(30) Foreign Application Priority Data

Jan. 8, 2013    (JP) ................................. 2013-000850

(51) Int. Cl.
*B65G 33/18* (2006.01)
*B65G 33/26* (2006.01)
*B65G 33/30* (2006.01)

(52) U.S. Cl.
CPC ................ *B65G 33/18* (2013.01); *B65G 33/26* (2013.01); *B65G 33/30* (2013.01)
USPC ............ 198/664; 198/662; 198/670; 198/676

(58) Field of Classification Search
CPC ......... B65G 33/06; B65G 33/18; B65G 33/30
USPC ................. 198/662, 663, 664, 669, 670, 676
See application file for complete search history.

(56) References Cited

U.S. PATENT DOCUMENTS

| 383,556 | A | * | 5/1888 | Brainard | 198/664 |
|---|---|---|---|---|---|
| 2,145,882 | A | * | 2/1939 | Lathrop | 198/530 |
| 2,173,414 | A | * | 9/1939 | Fulton | 198/530 |
| 2,693,873 | A | * | 11/1954 | Martin | 198/670 |
| 3,170,566 | A | * | 2/1965 | Zimmermann | 198/625 |
| 3,457,989 | A | * | 7/1969 | Nonnenmacher et al. | 165/87 |
| 3,549,000 | A | * | 12/1970 | Christian et al. | 198/659 |
| 3,580,389 | A | * | 5/1971 | Nonnenmacher | 198/625 |
| 4,078,653 | A | * | 3/1978 | Suter | 198/625 |
| 4,274,751 | A | * | 6/1981 | Rector et al. | 366/310 |
| 4,881,862 | A | * | 11/1989 | Dick | 414/218 |
| 6,763,932 | B2 | * | 7/2004 | Stenson et al. | 198/670 |
| 7,044,289 | B2 | * | 5/2006 | Madsen et al. | 198/663 |
| 7,255,223 | B2 | * | 8/2007 | Schaer et al. | 198/662 |
| 8,739,963 | B2 | * | 6/2014 | Nickerson et al. | 198/604 |
| 2010/0028089 | A1 | * | 2/2010 | Burke et al. | 406/53 |
| 2012/0125738 | A1 | * | 5/2012 | Ikeda et al. | 198/676 |

FOREIGN PATENT DOCUMENTS

| JP | 2002-240923 | 8/2002 |
|---|---|---|
| JP | 2008-39350 | 2/2008 |

* cited by examiner

*Primary Examiner* — Leslie A Nicholson, III
*Assistant Examiner* — Keith R Campbell
(74) *Attorney, Agent, or Firm* — Wenderoth, Lind & Ponack, L.L.P.

(57) ABSTRACT

A screw conveyor includes a plurality of shafts rotatable in a common imaginary plane, and a plurality of blades arranged on each of the shafts in an axial direction of the shafts such that the blades define a part of an imaginary spiral around the shafts, each of the blades being semicircular in shape when viewed in an axial direction of the shafts, a distance S being longer than a length D, but shorter than 2D, wherein "S" indicates a distance between outer surfaces of two shafts located adjacent to each other, and "D" indicates a length by which the blades extend from outer surfaces of the shafts.

11 Claims, 10 Drawing Sheets

SCREW CONVEYOR

BACKGROUND OF THE INVENTION

1. Field of the Invention

The invention relates to a screw conveyor having a function of feeding sludge, food wastes, wood chips and so on in a predetermined direction.

2. Description of the Related Art

There have been suggested a lot of screw conveyors and apparatuses including screw conveyors therein. In general, a screw conveyor includes rotational shafts having spiral blades on an outer surface thereof, and feeds an object in a predetermined direction by rotating the rotational shafts.

FIG. 9 is a side view of the screw conveyor suggested in Japanese Patent Application Publication No. 2002-240923, and FIG. 10 is a cross-sectional view of the screw conveyor.

As illustrated in FIGS. 9 and 10, the illustrated screw conveyor 200 includes two shafts 202 having spiral blades 201 on an outer surface thereof and being in parallel with each other. The screw conveyor 200 has a function of feeding an object in an axial direction of the shafts 202 by rotating the shafts 202.

FIG. 11 is a side view of the screw conveyor suggested in Japanese Patent Application Publication No. 2008-39350, and FIG. 12 is a cross-sectional view of the screw conveyor.

As illustrated in FIGS. 11 and 12, the illustrated screw conveyor 300 includes two shafts 302 having spiral blades 301 on an outer surface thereof and being in parallel with each other. The screw conveyor 300 has a function of feeding an object in an axial direction of the shafts 302 by rotating the shafts 302.

The conventional screw conveyors 200 and 300 can feed an object without fail, if the object is solid and has low moisture content. However, when the conventional screw conveyors 200 and 300 have to feed an object having a high moisture content and/or an object having a high viscosity, such as sludge or food wastes, the object is often stuck on the blades 201 and 301 formed on outer surfaces of the shafts 202 and 302, and an area between the blades 201 and 301 is often clogged, resulting in that the object cannot be scraped off from the blades 201 and 301.

Under such circumstances, it is unavoidable that the blades 201 and 301 cannot feed an object sufficiently, or a high load exerts on a motor which rotates the shafts 202 and 302. Consequently, after stopping rotation of the shafts 202 and 302, the blades 201 and 301 have to be cleaned, resulting in significant decrease in working efficiency.

SUMMARY OF THE INVENTION

In view of the above-mentioned problems in the conventional screw conveyors, it is an object of the present invention to provide a screw conveyor capable of preventing clogs caused by stuck objects.

In one aspect of the present invention, there is provided a screw conveyor including a plurality of shafts rotatable in a common imaginary plane, and a plurality of blades arranged on each of the shafts in an axial direction of the shafts such that the blades define a part of an imaginary spiral around the shafts, each of the blades being semicircular in shape when viewed in an axial direction of the shafts, a distance S being longer than a length D, but shorter than 2D, wherein "S" indicates a distance between outer surfaces of two shafts located adjacent to each other, and "D" indicates a length by which the blades extend from outer surfaces of the shafts.

There is further provided a screw conveyor including a plurality of shafts rotatable in a common imaginary plane, and a plurality of blades arranged on each of the shafts in an axial direction of the shafts such that the blades define a part of an imaginary spiral around the shafts, each of the blades including at least one fan-shaped blade when viewed in an axial direction of the shafts, a distance S being greater than a length D, but smaller than 2D, wherein "S" indicates a distance between outer surfaces of two shafts located adjacent to each other, and "D" indicates a length by which the blades extend from outer surfaces of the shafts.

It is preferable that each of blades has a shape comprised of a plurality of fans when viewed in an axial direction of the shafts, the fans being located within a semicircular area about each of the shafts.

It is preferable that the fans are identical in shape with one another.

It is preferable that the fans are equally spaced away from one another around each of the shafts.

It is preferable that the shafts are in parallel with one another.

It is preferable that the blades are situated in a line in an axial direction of the shafts.

It is preferable that the shafts rotate in a common direction.

It is preferable that the shafts rotate at different speed from one another.

It is preferable that the screw conveyor further includes a controller for controlling a rotation frequency of each of the shafts in dependence on physical properties of an object to be fed by means of the screw conveyor.

In the case that the screw conveyor in accordance with the present invention is applied to a dryer, the shafts may be formed therein a path through which heating medium can flow.

The advantages obtained by the aforementioned present invention will be described hereinbelow.

The screw conveyor in accordance with the present invention can avoid or lower the chances of clogs caused by stuck objects.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

The screw conveyor 100 in accordance with the first embodiment of the present invention defines a part of a dryer 10.

Figure 1:
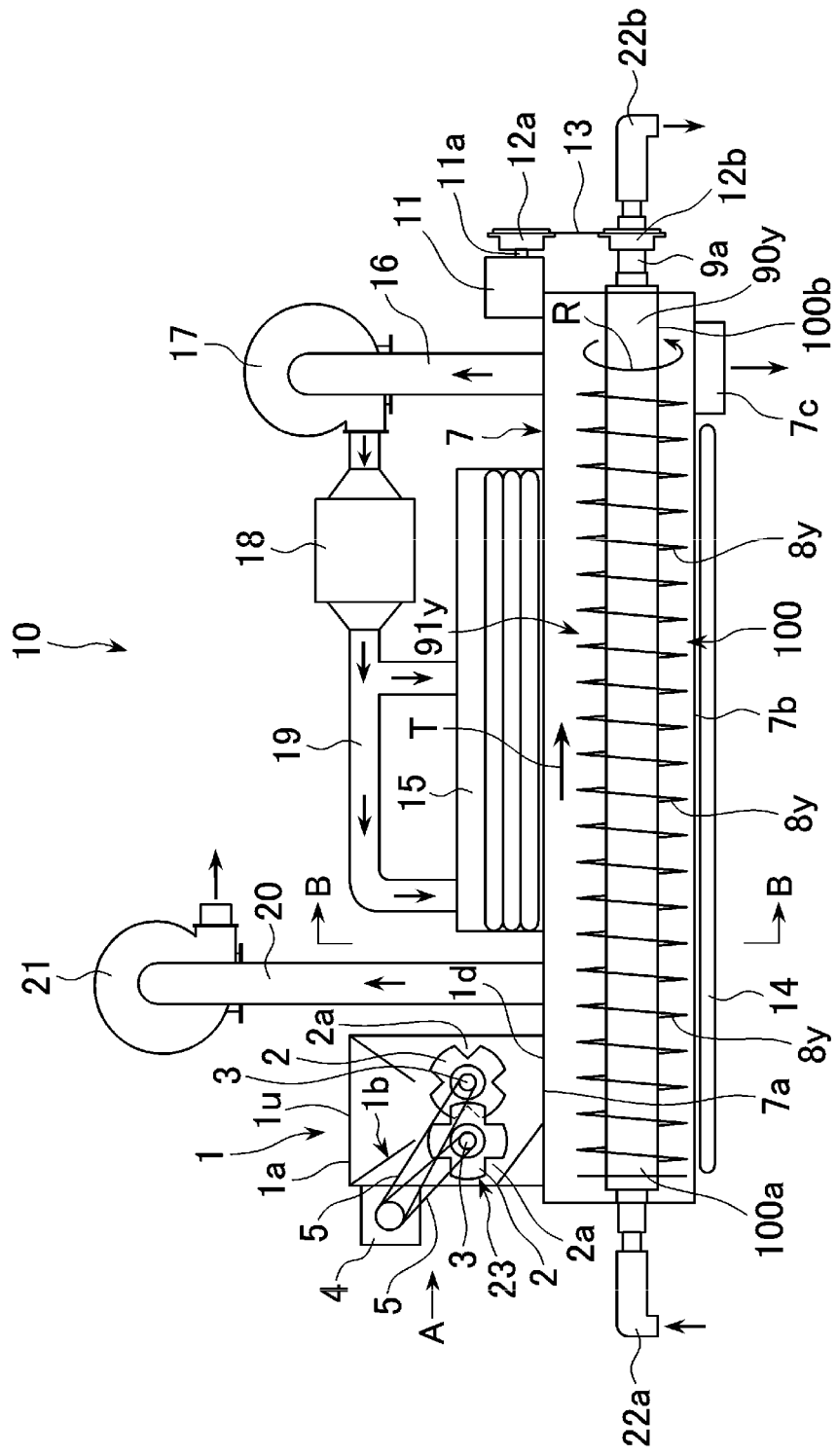
FIG. 1 illustrates a dryer to which the screw conveyor in accordance with the first embodiment of the present invention is applied.

As illustrated in FIG. 1, the dryer 10 includes a container 7 in which the screw conveyor 100 is housed, a motor 11 for rotating two hollow shafts 90x and 90y (having centers 90xc and 90yc, respectively) both defining a part of the screw conveyor 100, and rotary joints 22a and 22b rotatably supported the hollow shafts 90x and 90y at opposite ends thereof for allowing pre-heated moisture as heat carrier to flow in the hollow shafts 90x and 90y. A chain 13 is tensioned between a sprocket wheel 12a fixed to a drive shaft 11a of the motor 11, and sprocket wheels 12b fixed to ends 9a of the hollow shafts 90x and 90y.

Figure 3:
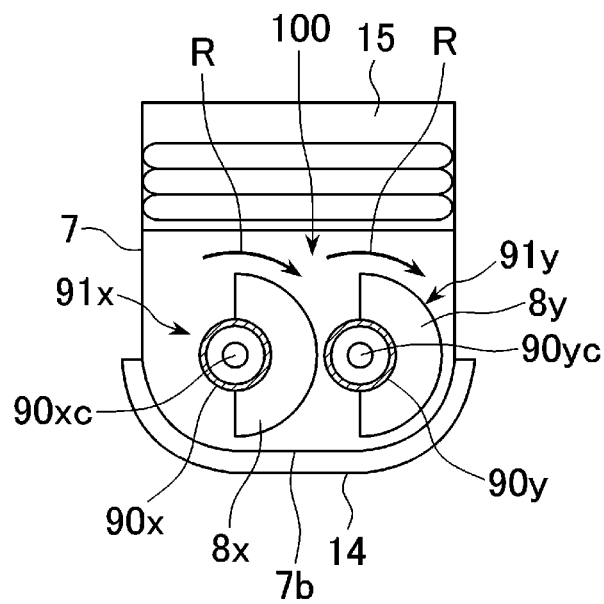
FIG. 3 is a cross-sectional view taken along the line B-B in FIG. 1, with a part being omitted.
Figure 4:
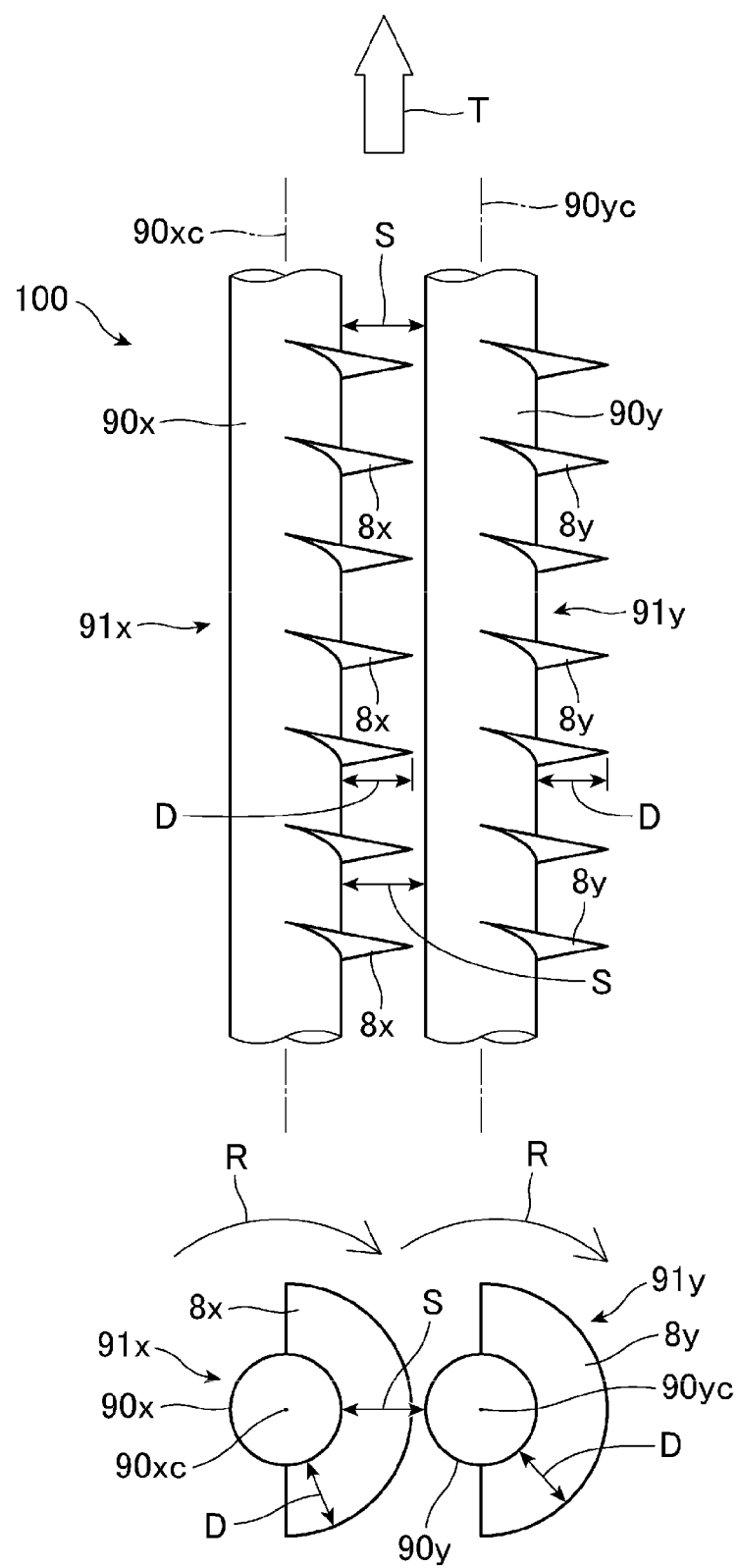
FIG. 4 is a view of the screw conveyor employed in the dryer illustrated in FIG. 1.

As illustrated in FIGS. 3 and 4, the screw conveyor 100 includes two rotational feeders 91x and 91y arranged in parallel with each other in the container 7. The rotational feeders 91x and 91y include, respectively, the hollow shafts 90x and 90y arranged in a common imaginary plane such that they are able to be rotated by the motor 11, and a plurality of blades 8x and 8y arranged on outer surfaces of the hollow shafts 90x and 90y in an axial direction thereof such that the blades 8x and 8y define a part of an imaginary spiral around the hollow shafts 90x and 90y.

The distance S is set longer than the length D, but shorter than 2D. Herein, "S" indicates a distance between outer surfaces of the two hollow shafts 90x and 90y located adjacent to each other, and "D" indicates a length by which the blades 8x and 8y extend from outer surfaces of the hollow shafts 90x and 90y.

Each of the blades 8x and 8y is semicircular in shape when viewed in an axial direction (direction T in FIG. 4) of the hollow shafts 90x and 90y.

Each of the blades 8x and 8y is formed around the hollow shafts 90x and 90y such that each of the blades 8x and 8y define an imaginary left-handed spiral around the centers 90xc and 90yc of the hollow shafts 90x and 90y, respectively. The blades 8x and 8y are formed in a line in an axial direction of the hollow shafts 90x and 90y (the direction T), respectively. The rotating feeders 91x and 91y are identical with each other in shape and size, and the hollow shafts 90x and 90y extend in parallel with each other. The blades 8x formed on an outer surface of the hollow shaft 90x and the blades 8y formed on an outer surface of the hollow shaft 90y are situated on the same locations in a length-wise direction of the hollow shafts 90x and 90y As illustrated in FIGS. 3 and 4, the hollow shafts 90x and 90y of the rotating feeders 91x and 91y are designed to rotate in a common direction (namely, a direction R in FIG. 4) to thereby feed an object (not illustrated) in an axial direction (the direction T in FIGS. 1 and 4) of the hollow shafts 90x and 90y. Rotation frequencies at which the rotating feeders 91x and 91y are made to rotate can be determined in dependence on an object to be fed and/or physical properties thereof. In the first embodiment, the rotating feeders 91x and 91y are set to rotate at 4 rpm and 2 rpm, respectively.

As illustrated in FIGS. 1 and 3, the container 7 has a substantially U-shaped bottom 7b. A heating tube 14 as a heater means is arranged below the bottom 7b. A heat exchanger 15 is situated on an upper surface of the container 7 in the vicinity of a center of the container 7. The heating tube 14 and the heat exchangers 15 and 18 have a function of heating the container 7 by virtue of externally supplied superheated steam. On the top surface of the container 7 in the vicinity of a start end 100a of the screw conveyor 100 are arranged a duct 20 leading to an area of the container 7 close to the start end 100a, and a blower 21 sucking and externally exhausting air existing in the container 7 through the duct 20.

On the container 7 in the vicinity of a trail end 100b of the screw conveyor 100 are arranged a duct 16 leading to an area of the container 7 close to the trail end 100b, and a blower 17 sucking air existing in the container 7 through the duct 16, and exhausting the air to a central area of the container 7 through the heat exchanger 18, the duct 19 and the heat exchanger 15. The heat exchanger 15 is located between the ducts 20 and 16. The air sucked from the container 7 through the duct 16 is gradually heated during passing through the heat exchangers 15 and 18, and then, fed again into the container 7. Thus, the air existing in the container 7 can dry an object to be fed by the screw conveyor 100 during circulating through the heat exchanger 18, the duct 19 and the heat exchanger 15.

Figure 2:
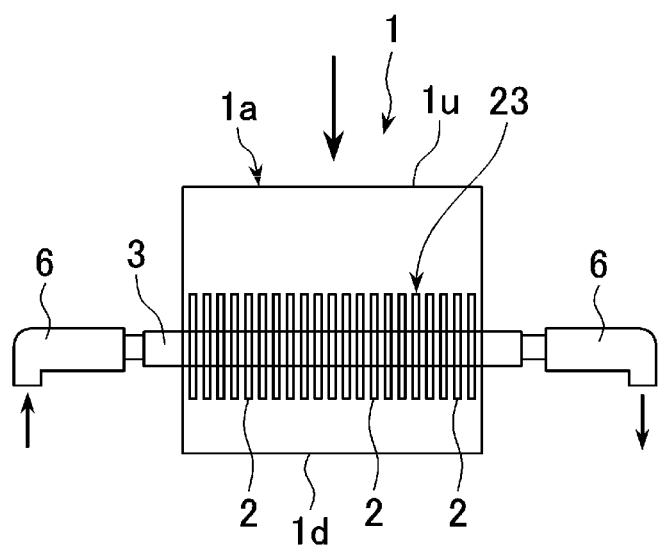
FIG. 2 is a view seen from a direction of the arrow A shown in FIG. 1.

As illustrated in FIGS. 1 and 2, a feeder 1 is situated on the container 7 above the start end 100a of the screw conveyor 100. The feeder 1 includes a box-shaped container 1a including therein a pair of rotors 23 arranged in parallel with each other, each of the rotors 23 including a hollow tube 3, and a plurality of circular discs 2 formed coaxially on an outer surface of the hollow tube 3, a motor 4 for rotating the rotors 23, and a pair of rotary joints rotatably supporting each of the hollow tubes 3 at its opposite ends for allowing pre-heated steam to pass through each of the hollow tubes 3.

As illustrated in FIG. 1, each of the circular discs 2 is formed with substantially V-shaped four cut-outs 2a by 90-degree interval around each of the hollow tubes 3. The motor 4 rotates the pair of rotors 23 by means of two chains 5. A distance between the hollow tubes 3 of the rotors 23 is set shorter than an outer diameter of the circular discs 2.

The container 1a includes a hopper 1b at an upper opening 1u, and has a lower opening 1d leading to an upper opening 7a of the container 7 above the start end 100a of the screw conveyor 100. The container 7 has an exhaust port 7c at a lower surface below the trail end 100b of the screw conveyor 100.

Hereinbelow is explained a process of drying sludge (not illustrated) by means of the dryer 10.

First, the motors 4 and 11 are turned on to thereby rotate the rotors 23 of the feeder 1 and the screw conveyor 100, and superheated steam supplied from a steam boiler (not illustrated) is fed to both the rotary joint 6 of the rotors 23 and the rotary joint 22a connected to the start end 100a of the screw conveyor 100.

The superheated steam supplied to the rotary joints 6 and 22a passes through the hollow tubes 3 and the hollow shafts 90x and 90y, and is exhausted through the opposite rotary joints 6 and 22b into a recovery device (not illustrated). The rotors 23 and the rotating feeders 91x and 91y are entirely heated up to a predetermined temperature by virtue of thermal conduction from the hollow shafts 90x and 90y having been heated by the superheated steam. When the rotors 23 and the rotating feeders 91x and 91y are heated to the predetermined temperature, the blowers 17 and 21 starts operating to circulate and exhaust air existing in the container 7.

Then, sludge to be dried is thrown into the hopper 1b through the upper opening 1u of the feeder 1. The sludge is heated and sliced by means of the circular discs 2 each having the cut-outs 2a during passing through the heated and rotating rotors 23. Then, the sludge passes through the lower opening 1d of the container 1a and then the upper opening 7a of the container 7, and thus, reaches at the start end 100a of the screw conveyor 100 housed in the container 7.

The sludge thrown into the start end 100a of the screw conveyor 100 is stirred by the blades 8x and 8y of the rotating feeders 91x and 91y having been heated to thereby be fed towards the trail end 100b. While the sludge is being made to move towards the trail end 100b, the sludge is heated and then dried by making contact with the heated rotating feeders 91x and 91y. Then, the thus dried sludge is exhausted through the exhaust port 7c located at the trail end 100b of the screw conveyor 100.

Figure 5:
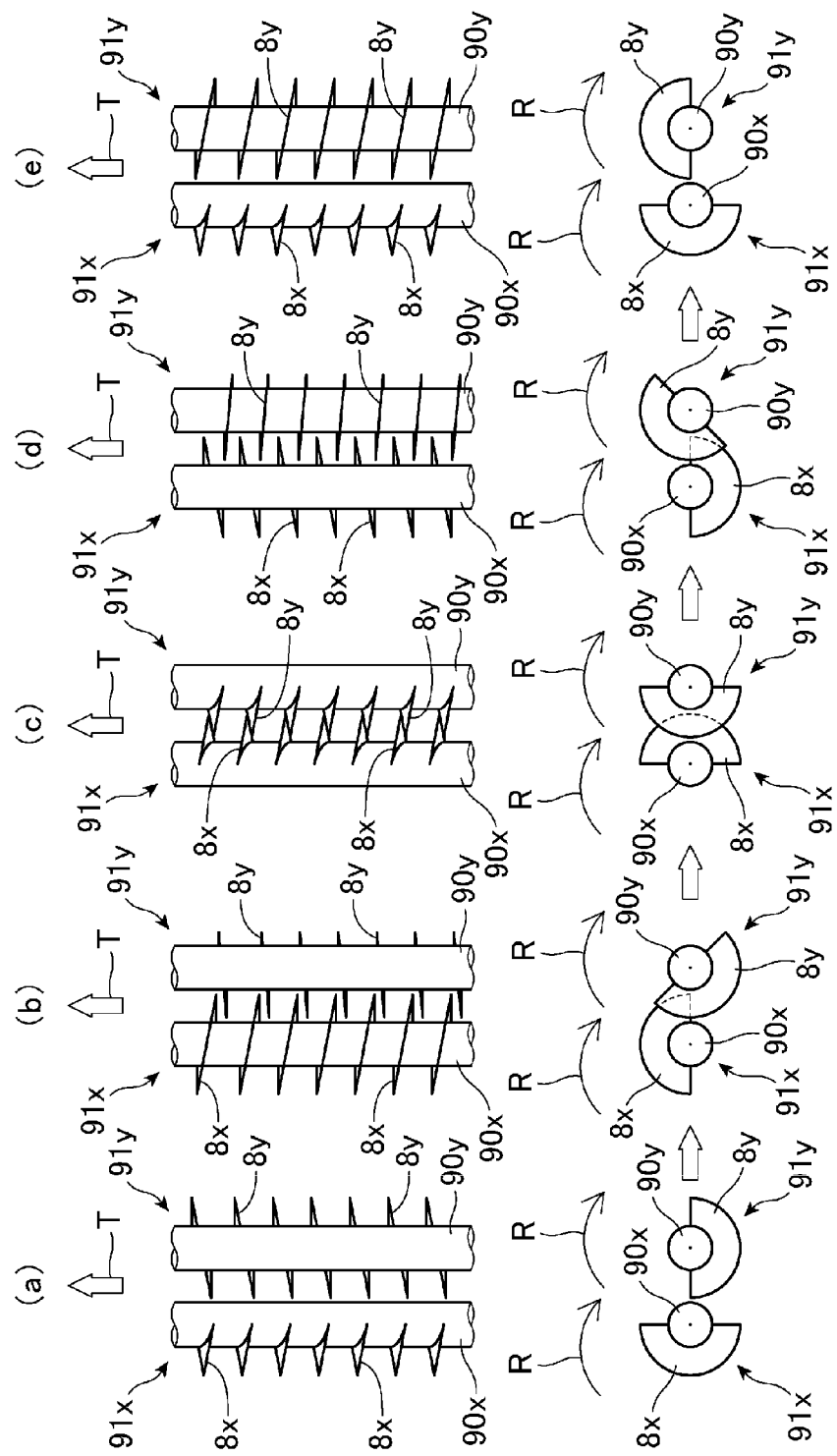
FIG. 5 illustrates the motion of the screw conveyor illustrated in FIG. 4.

Since the rotating feeders 91x and 91y are made to rotate at 4 rpm and 2 rpm, respectively, in the first embodiment, the positional relation between the blades 8x of the rotating feeder 91x and the blades 8y of the rotating feeder 91y varies with the lapse of time in such a way as shown in FIG. 5 (a) to (e). While the rotation of the blades 8x and 8y, they do not overlap each other in the direction T, as illustrated in FIGS. 5 (a) and (e), they approach each other, partially overlap each other, and move away from each other, as illustrated in FIGS. 5 (b) and (d), or they partially overlap each other, as illustrated in FIG. 5 (c). Thus, it is possible to avoid the sludge from sticking on the blades 8x and 8y, and further, avoid a space formed between the adjacent blades 8x and 8y from being clogged with the sludge.

Accordingly, the screw conveyor 100 can avoid reduction in sludge-feeding capacity of the blades 8x and 8y, caused by clogs with sticking sludge, and further, avoid an increase in a load exerted on the motor 11. Hence, it is not necessary to stop the operation of the screw conveyor 100 for the sake of removal of the sludge, ensuring significant enhancement in an efficiency at which the screw conveyor 100 feeds the sludge.

In dependence on a content, physical properties, and a water content of sludge, a temperature of heated steam to be supplied into the hollow tubes 3 and the hollow shafts 90x and 90y can be controlled to keep the rotors 23 and the screw conveyor 100 at an optimal temperature, and a speed of the screw conveyor 100 (that is, a rotational speed of the rotating feeders 91x and 91y) can be controlled, ensuring it possible to effectively dry an object such as sludge.

As illustrated in FIG. 1, since the dryer 10 has a relatively simple structure, specifically, the dryer 10 includes the motor 11 for driving the screw conveyor 100 housed in the container 7, and a heating system including the hollow shafts 90x and 90y through which superheated steam passes, and the rotary joints 22a and 22b, it is possible to treat and maintain the dryer 10 with ease, and further, the dryer 10 makes small noises. Furthermore, since pre-heated heat carrier (superheated steam in the first embodiment) is used for heating the screw conveyor 100, no exhaust gas nor smoke are generated while the screw conveyor 100 is in operation.

As illustrated in FIGS. 1 and 3, since the heating tube 14 is attached to a bottom of the container 7, sludge thrown into the container 7 can be soon heated, and thus, steam is soon evaporated, ensuring superior function of drying sludge.

Furthermore, since the screw conveyor 100 is designed to include the blower 17 sucking air from an area around the trail end 100b of the screw conveyor 100 in the container 7, feeding the air to the heat exchangers 18 and 15 for heating the air, and introducing the heated air to an area in the vicinity of a center of the screw conveyor 100 in the container 7, it is possible to soon heat the container 7 and make effective use of exhausted heat, ensuring enhancement in drying ability and energy saving.

Furthermore, since the screw conveyor 100 is designed to include the duct 20 and the blower 21 as air exhausting means for exhausting steam generated in the container 7, it is possible to avoid steam generated from sludge dried while being fed by the screw conveyor 100, from staying in the container 7, ensuring enhancement in drying ability.

Since the feeder 1 is located on the container 7 above the start end 100a of the screw conveyor 100, sludge thrown into the feeder 1 through the upper opening 1u of the container 1a is sliced and preliminarily heated by means of the pair of heated and rotating rotors 23, and then, is thrown into the start end 100a of the screw conveyor 100, ensuring enhancement in ability of drying sludge.

It should be noted that though the dryer 10 including the screw conveyor 100 in accordance with the first embodiment is designed to dry sludge, the dyer 10 may be used to dry other materials. For instance, the dryer 10 may be used to effectively dry an object other than sludge, such as wood chip, food waste, wood pellet, bamboo chip, and so on.

The screw conveyor 100 included in the dryer 10 is just an example of the screw conveyor in accordance with the present invention, and hence, it should be noted that the scope of the present invention is not to be limited to the screw conveyor 100 in accordance with the first embodiment.

For instance, the blades 8x and 8y in the first embodiment is designed to have a semicircular shape when viewed in an axial direction (the direction T in FIGS. 1 and 4) of the hollow shafts 90x and 90y. As an alternative, the blades 8x and 8y may be designed to be fan-shaped or arcuate (a circumferential angle being smaller than 180 degrees).

Second Embodiment

Figure 6:
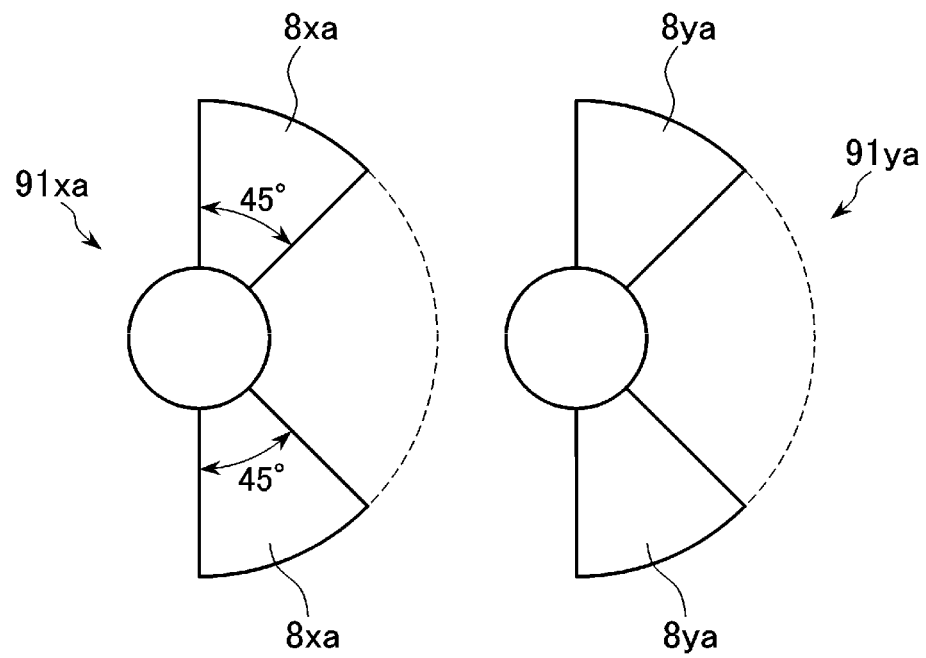
FIG. 6 is a plan view of the rotational feeders defining a part of the screw conveyor in accordance with the second embodiment of the present invention.

FIG. 6 is a plane view of the feeders to be used in the screw conveyor in accordance with the second embodiment.

Whereas the rotating feeders 91x and 91y in the first embodiment are designed to include the semicircular blades 8x and 8y, each of the rotating feeders 91xa and 91ya in the second embodiment is designed to have two blades 8xa and 8ya, respectively, which are fan-shaped or arcuate (a circumferential angle being smaller than 180 degrees) when viewed in an axial direction (the direction T in FIGS. 1 and 4) of the hollow shafts 90x and 90y, as illustrated in FIG. 6.

Each of the two fan-shaped blades 8xa and 8ya has a 45-degree circumferential angle around the centers 90xc and 90yc of the hollow shafts 90x and 90y. That is, the two fan-shaped blades 8xa and 8ya are identical in shaped with each other.

Furthermore, the two fan-shaped blades 8xa and 8ya are located within a semicircular area around the centers 90xc and 90yc of the hollow shafts 90x and 90y.

Specifically, a side edge (a left side edge in FIG. 6) of one of the blades 8xa and 8ya (the blade located upper than the other in FIG. 6) and a side edge (a left side edge in FIG. 6) of the other blade (the blade located lower than the other in FIG. 6) are both located on a certain diameter of the hollow shafts 90x and 90y. Thus, the two fan-shaped blades 8xa and 8ya are located within a semicircular area around the centers 90xc and 90yc of the hollow shafts 90x and 90y.

As mentioned above, by using the fan-shaped blades 8xa and 8ya in place of the semicircular blades 8x and 8y, the screw conveyor in accordance with the second embodiment can provide the same advantages as those provided by the screw conveyor 100 in accordance with the first embodiment.

A number of the fan-shaped blades to be included in the rotating feeders 91xa and 91ya is not to limited to two. Any number equal to or greater than three may be chosen.

Figure 7:
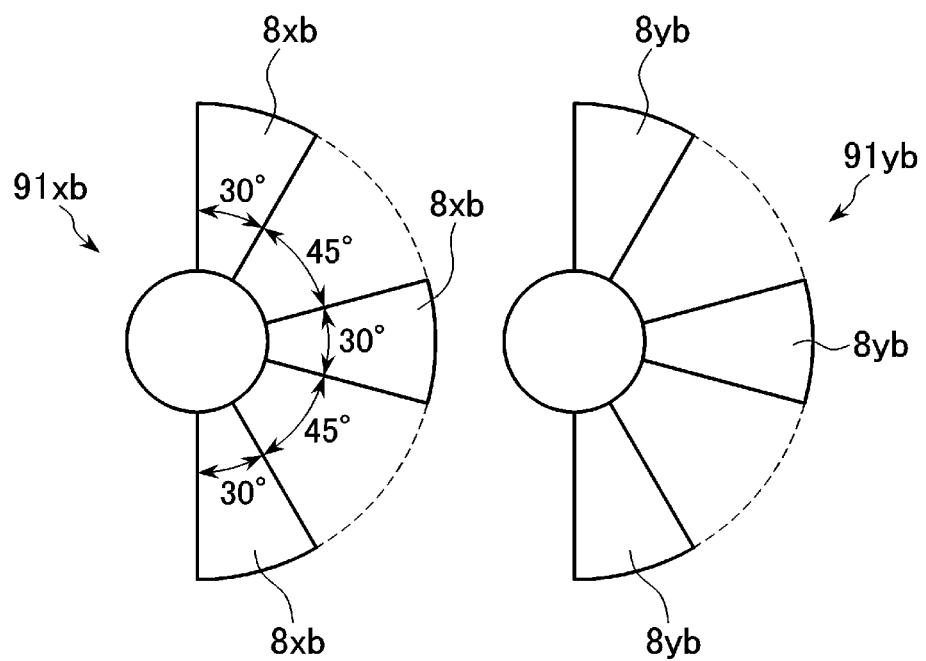
FIG. 7 is a plan view of the rotational feeders defining a part of the screw conveyor in accordance with the variation of the second embodiment.

FIG. 7 is a plane view of the rotating feeders 91xb and 91yb including the three fan-shaped blades 8xb and 8yb.

As illustrated in FIG. 7, each of the three fan-shaped blades 8xb and 8yb is designed to have a 30-degree circumferential angle about the centers 90xc and 90yc, and further, the three fan-shaped blades 8xb and 8yb are all located within a semicircular area about the centers 90xc and 90yc.

Specifically, a side edge (a left side edge in FIG. 7) of one of the three fan-shaped blades 8xb and 8yb (the blade located uppermost than the others in FIG. 7) and a side edge (a left side edge in FIG. 7) of one of the other blades (the blade located lowermost than the others in FIG. 7) are both located on a certain diameter of the hollow shafts 90x and 90y. The rest of the three fan-shaped blades 8xb and 8yb is located intermediate between the other two blades. Thus, the three fan-shaped blades 8xb and 8yb are equally spaced from one another and located within a semicircular area around the centers 90xc and 90yc of the hollow shafts 90x and 90y.

Third Embodiment

Figure 8:
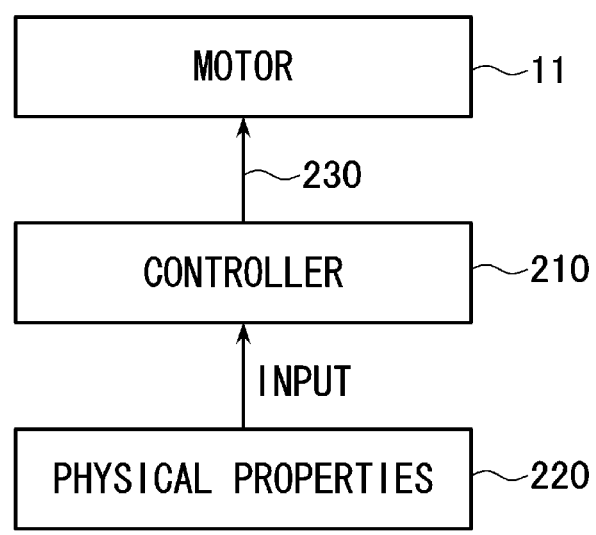
FIG. 8 is a partial block diagram of the screw conveyor in accordance with the third embodiment of the present invention.
Figure 9:
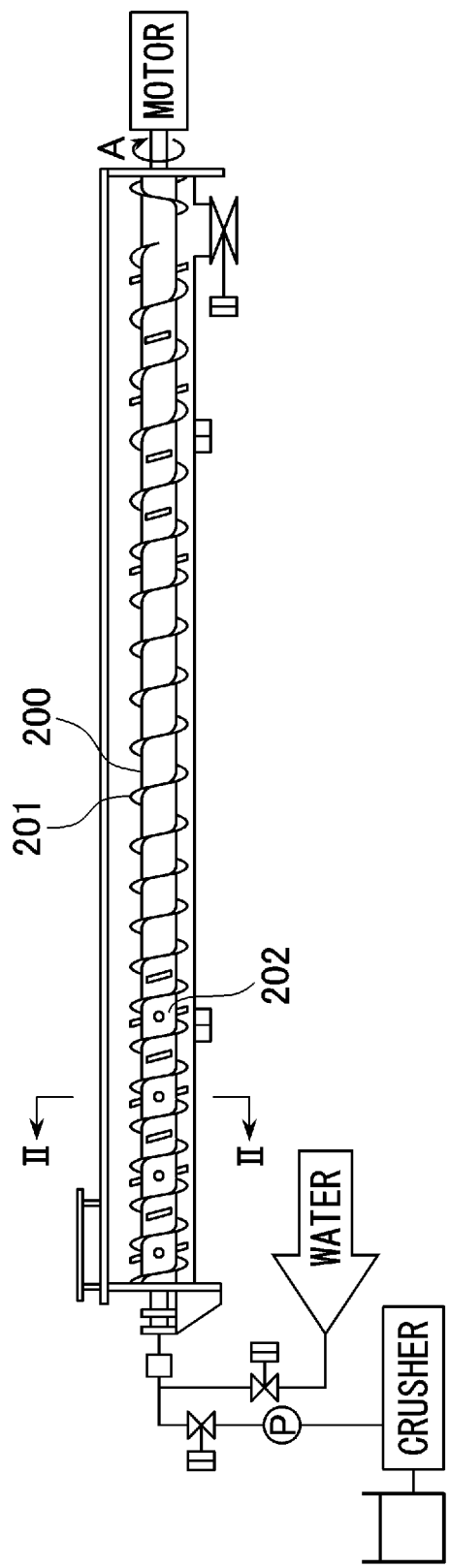
FIG. 9 is a side view of the first conventional screw conveyor
Figure 10:
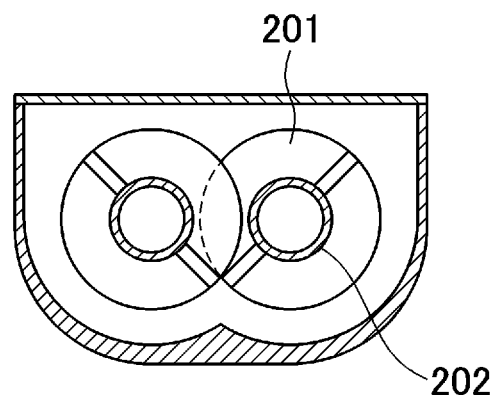
FIG. 10 is a cross-sectional view of the first conventional screw conveyor illustrated in FIG. 9.
Figure 11:
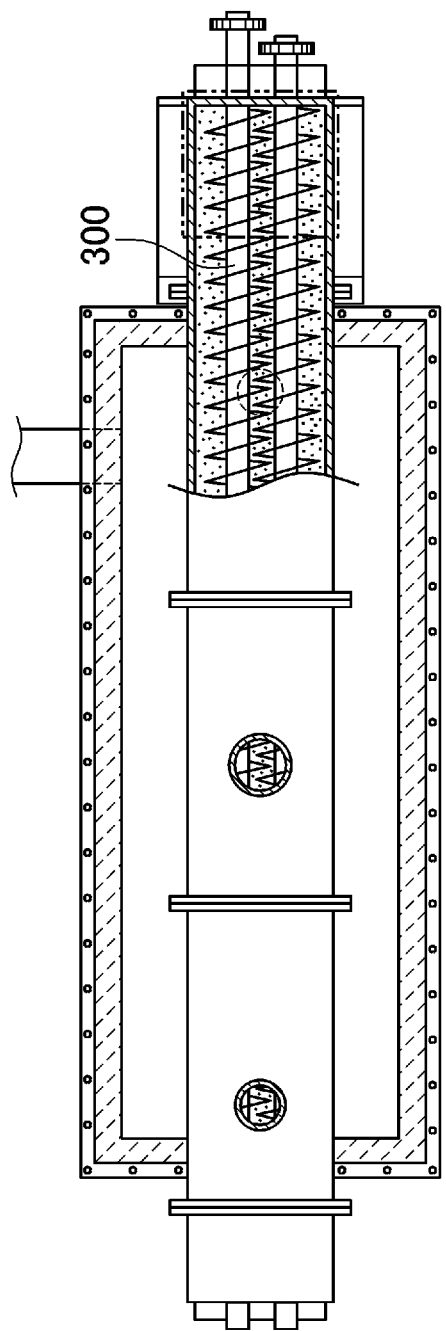
FIG. 11 is a side view of the second conventional screw conveyor
Figure 12:
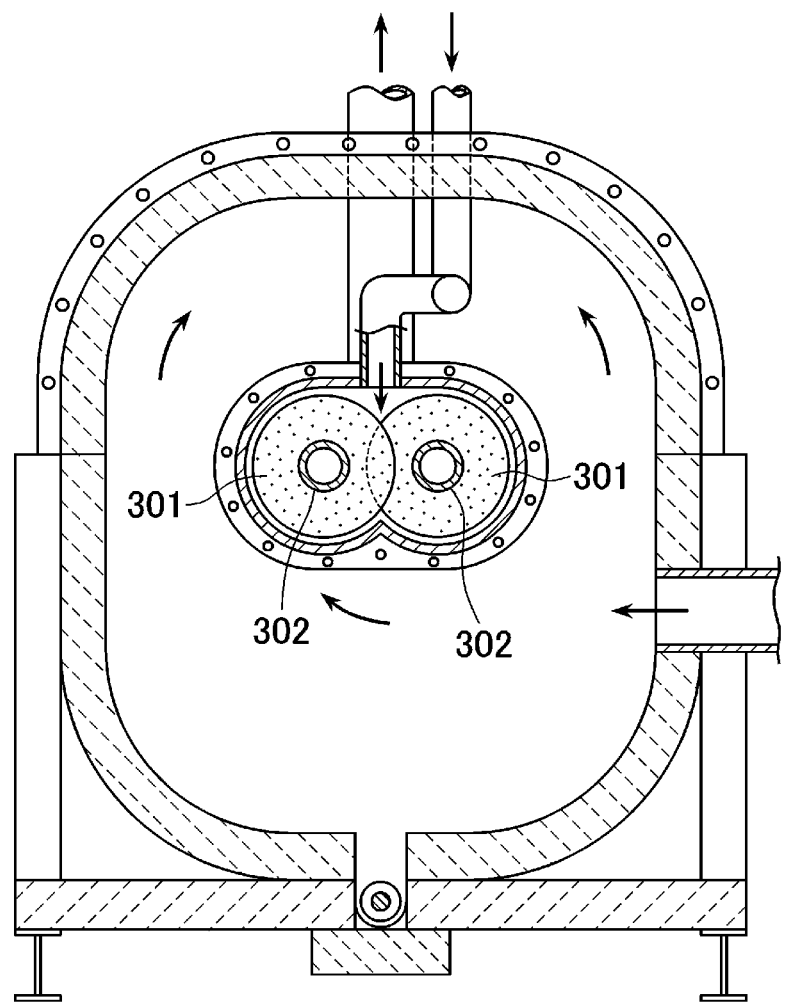
FIG. 12 is a cross-sectional view of the second conventional screw conveyor illustrated in FIG. 11.

FIG. 8 is a partial block diagram of the screw conveyor in accordance with the third embodiment.

In comparison with the screw conveyor in accordance with the first embodiment, the screw conveyor in accordance with the third embodiment additionally includes a controller 210 for controlling rotation speed of the hollow shafts 90x and 90y.

The controller 210 controls rotation speed of the hollow shafts 90x and 90y in dependence on physical properties of sludge to be fed by the screw conveyor.

Specifically, physical properties 220 of sludge to be fed by the screw conveyor, such as water content and viscosity, is input in advance to the controller 210. The controller 210 computes optimal rotation speed of the hollow shafts 90x and 90y in dependence on the received physical properties 220, and transmits a signal 230 indicative of the computed rotation speed to the motor 11. The motor 11 rotates the hollow shafts 90x and 90y at the rotation speed indicated in the received signal 230.

For instance, if sludge has a relatively high viscosity, the controller 210 transmits the signal 230 so as to rotate the hollow shafts 90x and 90y at a relatively small rotation speed, and if sludge has a relatively low viscosity, the controller 210 transmits the signal 230 so as to rotate the hollow shafts 90x and 90y at a relative high rotation speed.

In the screw conveyor in accordance with the third embodiment, optimal rotation speed at which the hollow shafts 90x and 90y are rotated are determined in dependence on physical properties of sludge. Consequently, it is possible to surely avoid the blades 8x and 8y from being stuck with sludge.

The screw conveyor in accordance with the third embodiment may be designed to include a device for measuring a water content of sludge and/or a device for measuring a viscosity of sludge.

INDUSTRIAL APPLICABILITY

The screw conveyor in accordance with the present invention can be used as a feeder for feeding sludge, food waste, wood chip, wood pellet, bamboo chip, and so on broadly in various industry fields.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2013-850 filed on Jan. 8, 2013 including specification, claims, drawings and summary is incorporated herein by reference in its entirety.

What is claimed is:

1. A screw conveyor including:
   two shafts rotatable in a common imaginary plane and in parallel with each other; and
   a plurality of blades arranged on each of said shafts in an axial direction of said shafts such that said blades define a part of an imaginary spiral around said shafts,
   each of said blades being semicircular in shape when viewed in an axial direction of said shafts,
   a distance S being longer than a length D, but shorter than 2D,
   wherein "S" indicates a distance between outer surfaces of said two shafts located adjacent to each other, and "D" indicates a length by which said blades extend from outer surfaces of said shafts,
   said blades being situated on each shaft in a line in the axial direction of said shafts,
   wherein one of said shafts rotates at a speed which is twice greater than a speed of the other of said shafts,
   said shafts being arranged such that straight edges of said blades on one of said shafts are perpendicular to straight edges of said blades on the other of said shafts when said shafts start rotation.

2. The screw conveyor as set forth in claim 1, wherein said shafts rotate in a common direction.

3. The screw conveyor as set forth in claim 1, further comprising a controller for controlling a rotation speed of each of said shafts in dependence on physical properties of an object to be fed by means of said screw conveyor.

4. A screw conveyor including:
   a plurality of shafts rotatable in a common imaginary plane; and
   a plurality of blades arranged on each of said shafts in an axial direction of said shafts such that said blades define a part of an imaginary spiral around said shafts,
   each of said blades including at least one fan-shaped blade when viewed in an axial direction of said shafts,
   a distance S being longer than a length D, but shorter than 2D,
   wherein "S" indicates a distance between outer surfaces of said two shafts located adjacent to each other, and "D" indicates a length by which said blades extend from outer surfaces of said shafts,
   each of said blades having a shape comprised of a plurality of fans when viewed in the axial direction of said shafts, said fans being located within a semicircular area about one of said shafts.

5. The screw conveyor as set forth in claim 4, wherein said fans are identical in shape with one another.

6. The screw conveyor as set forth in claim 5, wherein for each of said blades, said fans are equally spaced away from one another around said one of said shafts.

7. The screw conveyor as set forth in claim 4, wherein said shafts are in parallel with one another.

8. The screw conveyor as set forth in claim 4, wherein said blades are situated on each shaft in a line in the axial direction of said shafts.

9. The screw conveyor as set forth in claim 4, wherein said shafts rotate in a common direction.

10. The screw conveyor as set forth in claim 4, wherein said shafts rotate at different speeds relative to one another.

11. The screw conveyor as set forth in claim 4, further comprising a controller for controlling a rotation speed of each of said shafts in dependence on physical properties of an object to be fed by means of said screw conveyor.

\* \* \* \* \*